(12) United States Patent
Doriguzzi Bozzo

(10) Patent No.: US 6,384,420 B1
(45) Date of Patent: May 7, 2002

(54) PORTABLE SELF-LEVELING LASER RAY DEVICE

(75) Inventor: Mario Doriguzzi Bozzo, San Donato Milanese (IT)

(73) Assignee: Micro Italiana S.p.A., Arzignano (IT)

( * ) Notice: Subject to any disclaimer, the term of this patent is extended or adjusted under 35 U.S.C. 154(b) by 0 days.

(21) Appl. No.: 09/496,935

(22) Filed: Feb. 2, 2000

(30) Foreign Application Priority Data

Feb. 3, 1999 (IT) .......................................... MI99A0206

(51) Int. Cl.$^7$ ................................................ G01N 21/86
(52) U.S. Cl. ...................... 250/548; 250/559.3; 356/149
(58) Field of Search ................................ 250/548, 559.3, 250/559.29, 239; 356/149, 250, 138, 373, 375; 33/DIG. 21, 291, 290

(56) References Cited

U.S. PATENT DOCUMENTS

| | | | |
|---|---|---|---|
| 3,771,876 A | 11/1973 | Ljungdahl et al. | 356/138 |
| 4,363,302 A | 12/1982 | Pischinger | 123/337 |
| 4,420,438 A | 12/1983 | Goosen | 261/65 |
| 4,448,528 A | 5/1984 | McManus | 356/250 |
| 4,852,265 A * | 8/1989 | Rando et al. | 33/227 |
| 5,009,681 A | 4/1991 | Jochum | 55/416 |
| 5,144,487 A | 9/1992 | Hersey | 359/629 |
| 5,782,003 A | 7/1998 | Bozzo | 33/291 |

FOREIGN PATENT DOCUMENTS

DE  4115336  11/1992

* cited by examiner

*Primary Examiner*—Que T. Le
(74) *Attorney, Agent, or Firm*—Steinberg & Raskin, P.C.

(57) ABSTRACT

A portable gravity-based self-levelling device for projecting a laser ray or a flat beam of laser rays (L, L11, L12, L110, L120) in a horizontal and/or vertical direction even if the device lies in an inclined position, comprises: a case (C) in the form of a hollow housing (1); a pendulum (11) suspended inside the case (C) by suspension means (5, 9); means (23A, 23B, 24) for damping the pendulum swing; means (18, 19) for adjusting the equilibrium position of the pendulum (11); and, mounted on the pendulum (11), means (12) for projecting collimated visible laser rays. The suspension means comprise at least one first mechanical decoupling member such as a ball or roller bearing (5), associated with the hollow housing (1), and, lying in a plane perpendicular to that of the first member (5), a second mechanical decoupling member rigidly secured to the movable part (6) of said first member and supporting the pendulum (11).

18 Claims, 5 Drawing Sheets

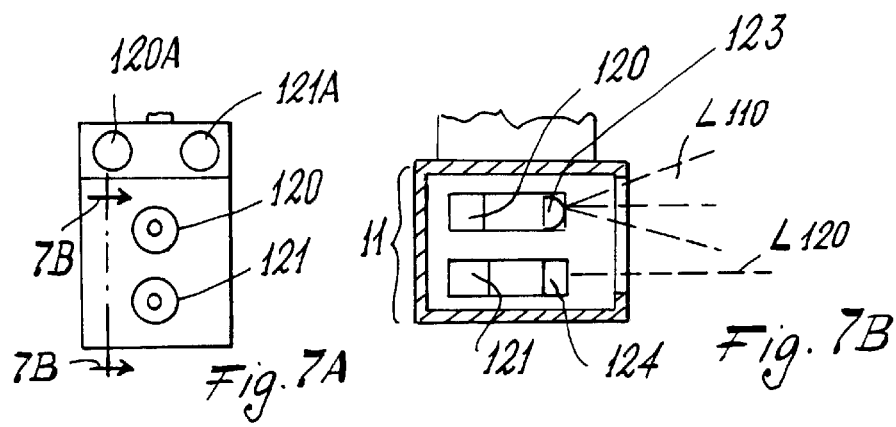
Fig. 7A
Fig. 7B
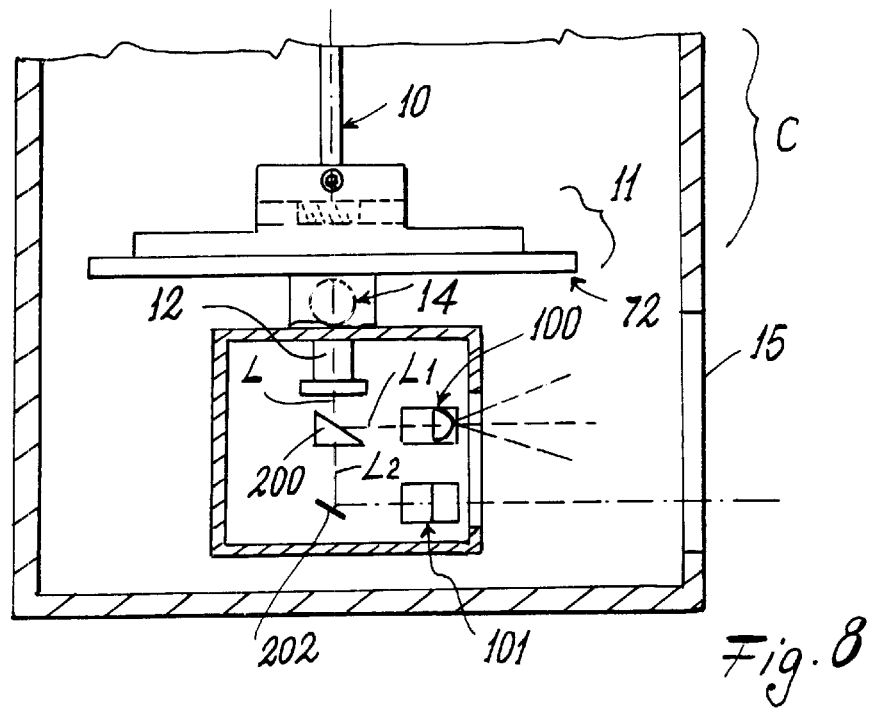
Fig. 8
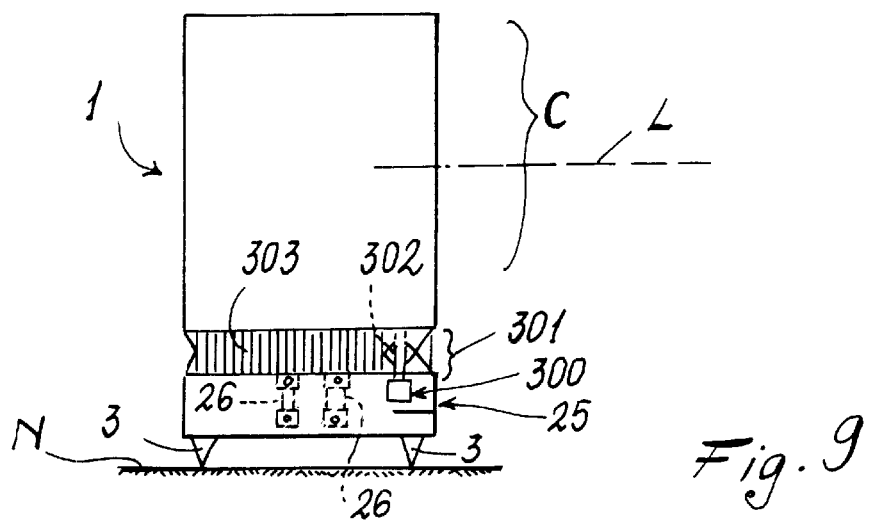
Fig. 9

PORTABLE SELF-LEVELING LASER RAY DEVICE

FIELD OF THE INVENTION

This invention relates to a portable self-levelling measurement device with laser ray emissions.

BACKGROUND OF THE INVENTION

Numerous manual self-levelling devices exist which, utilizing the force of gravity, project laser rays able for example to define horizontal and/or vertical alignments or levelling even if the device lies on a surface inclined by a few degrees to the horizontal or the device is in an inclined position on a horizontal surface.

U.S. Pat. No. 3,771,876 describes a device of the said type comprising a pendulum consisting of a moving assembly carrying a vertically positioned laser ray generator. This assembly is suspended by a wire from a hollow case within which it can swing until it reaches its equilibrium position by virtue of the damping action provided by the presence of magnets which generate parasitic currents. Within this device, the vertical ray generated by the laser is projected against a lens (pentaprism) which deviates this ray through 90°, to hence obtain a horizontal ray which leaves the said hollow case or housing. By rotating the pentaprism, driven by a small electric motor, the ray can be projected horizontally through 360°.

Other known devices are described in U.S. Pat. No. 5,724,744 and U.S. Pat. No. 5,782,003. In these documents, a pendulum containing a laser diode, positioned such as to project a horizontal laser ray when the pendulum is at rest, is coupled to a cross fixed to the inside of the case. With the pendulum in its equilibrium position, on rotating the case which is connected to a base via a ball bearing, the horizontal ray leaving this case generates a flat horizontal laser beam. A mechanical damping system which grazes the bottom of the pendulum shortens the time required for attaining the equilibrium position.

A further known device, described in U.S. Pat. No. 5,680,208, comprises a pendulum connected to a hooking point within the hollow housing by an element of flexible synthetic material, for example in the form of a band or strip (known commercially as mylar) which replaces the cross used in U.S. Pat. No. 5,782,003 or U.S. Pat. No. 5,724,744.

In general, the described devices are of rather complex construction and often suffer from intrinsic manufacturing limits. For example, the use of the cross as a suspension means for the pendulum requires the use of four mechanical decoupling members or bearings, and requires a pendulum of fairly large weight to overcome the friction of the various (numerous) bearings to enable the pendulum to always halt in its correct equilibrium position.

In contrast, the use of the element of thin flexible material (for example mylar) as the suspension member has an intrinsic limit deriving from the nature of the material itself and difficulty of enabling sensitivity, elasticity and torsional inertia to coexist within such an element, which is for example in the form of a thin strip.

OBJECTS AND SUMMARY OF THE INVENTION

An object of the invention is to improve the known solutions with a view to decreasing their currently high cost, deriving from their complicated construction because of the number of their component parts, their complicated assembly and the complexity of their mechanical damping system, while at the same time overcoming those problems of friction, torsion during rotation and overall size which have been highlighted in the aforegoing description of the state of the art.

Hence an object of the invention is to provide a self-levelling device of simple construction and reliable use, which comprises a small number of easily constructed and assembled mechanical parts, and is able to project in a visible and stable manner an always horizontal laser ray (or vertical by deviation through 90°) even if the device is inclined by a few degrees, for example ±5°.

A further object is to provide a device of the stated type which enables a laser ray to be projected through 360° always horizontally even if the device is resting on a surface inclined by a few degrees.

A further object is to provide a lightweight device of small dimensions which is extremely competitive and economical, besides being robust, reliable and accurate.

These and further objects which will be apparent to the expert of the art are attained by a self-levelling device in accordance with the accompanying claims.

BRIEF DESCRIPTION OF THE DRAWINGS

The invention will be more apparent from the accompanying drawing, which is provided by way of non-limiting example and on which:

FIGS. 7A and 7B are respectively a schematic front view and a section on the line 7B—7B of FIG. 7A, of a variant of the pendulum of the device shown in FIG. 5;

FIG. 8 is a schematic partial view of a further variant of the pendulum of the device of FIG. 5; and FIG. 9 is a schematic side view of a further variant of the device of FIG. 2.

DETAILED DESCRIPTION OF THE PREFERRED EMBODIMENTS

Figure 1:
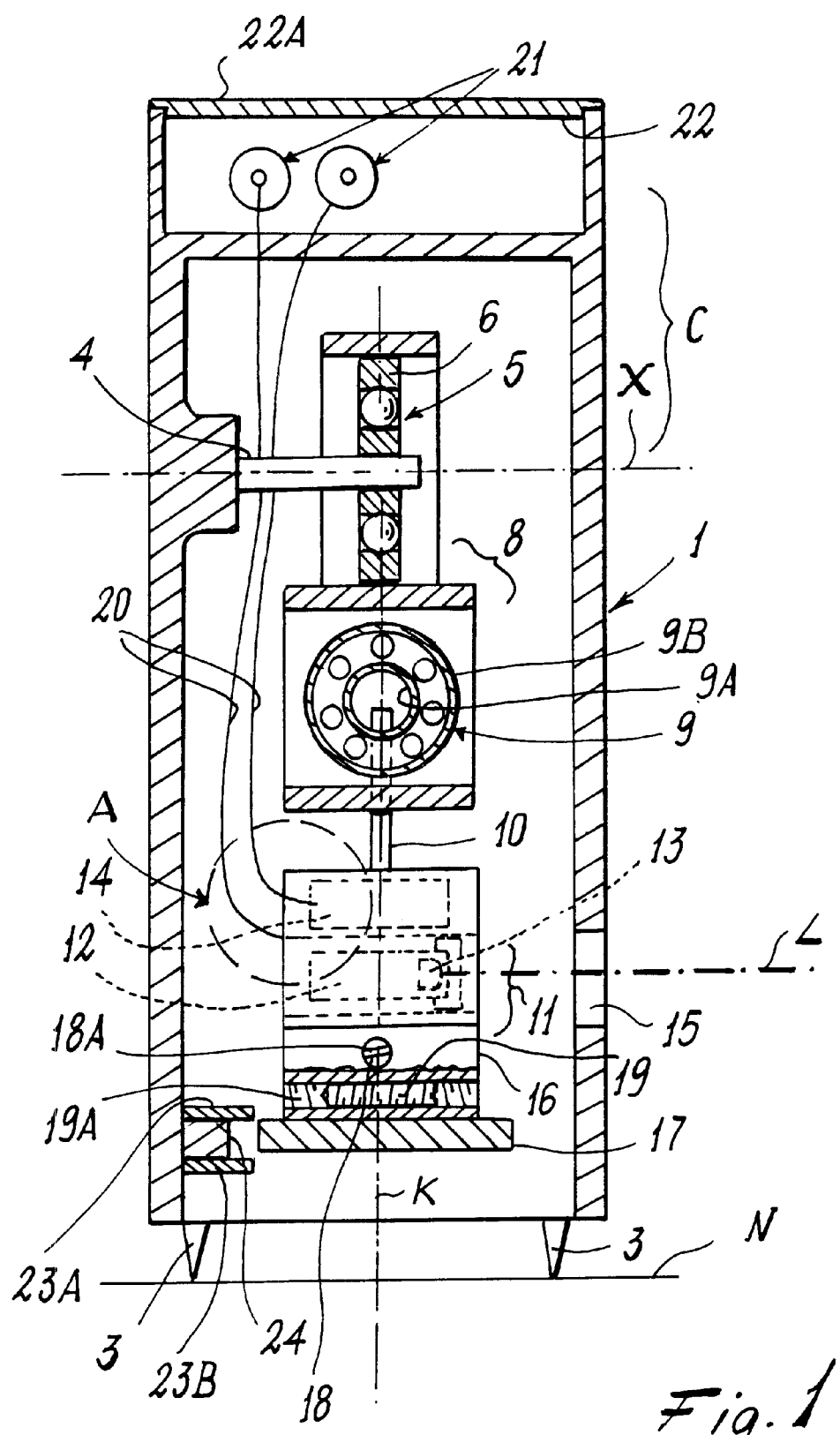
FIG. 1 is a schematic front view in longitudinal section of a first device of the invention.

The device is described hereinafter with reference to the accompanying drawings, on which corresponding parts are indicated by the same reference numerals.

In a first embodiment—FIG. 1—the invention comprises a portable case C consisting of a hollow housing 1, for example of cylindrical shape; provided with three feet 3 (only two of which are visible in the figure), Inside the housing 1 there is inserted a fixed pin 4, the axis X of which lies substantially parallel to the surface on which the feet 3 rests. This pin carries a ball or roller bearing 5 having its axis coinciding with said axis X. The bearing 5 is inserted into a rigid block 8 rigidly fixed to the movable outer ring 6 of the bearing. Into the block there is inserted a second ball or roller bearing 9 which lies in a plane perpendicular to that in which the bearing 5 lies and of which the middle plane contains the axis of this latter bearing. This latter bearing is fixed to the interior of the block 8 by having its outer ring 9B fixed to this latter, and has its usual inner ring 9A movable relative to the block. The ring 9A is rigidly connected via a rigid rod 10 to a pendulum 11 (or swinging assembly) in which there is inserted a known laser diode 12 provided with a collimation lens 13 and relative card with a known circuit 14 for controlling the operation of said diode and generally of the entire device.

The diode 121 is arranged in such a manner as to project a collimated laser ray L through an aperture 15 provided in the housing 1. This ray is perpendicular to the longitudinal axis K of the pendulum, which at its end carries a weight 16 below which there is a copper disc 17. Two adjustment set screws 18 and 19 are inserted into the weight 16 and positioned preferably perpendicular to each other and preferably both perpendicular to the axis K, to enable the barycentre of the pendulum 11 to be displaced by shifting their mass within the respective threaded holes 18A and 19A, in order to determine the rest position of the pendulum in which the diode 12 projects the laser ray in a horizontal direction.

Two phosphor bronze wires 20 of small diameter, for example 0.10 mm, connect common powering batteries 21 to the card 14, which is connected to the diode by common copper wires (not shown in the figure). The batteries are positioned in an openable upper cavity 22 in the housing 1 closed by a cover 22A.

When the disc 17 swings it cuts the magnetic flux which in the example shown in the figure is created between two parallel ferromagnetic plates 23A and 23B between which a magnet 24 is interposed. This solution defines a known system for damping the pendulum swing. In this respect the parasitic currents induced in the disc by the effect of the swinging movement generate a force equal and opposite to the cause which has generated it, so damping the pendulum swing. Hence by providing two magnets with relative plates arranged at 90°, effective damping is obtained whatever the direction of swing.

Alternatively the damping system can comprise a U-shaped magnet with positive and negative poles or two oppositely polarized elements connected together by a ferromagnetic element.

The described device is much more sensitive and accurate than already known devices, in that friction is reduced to a minimum. For example, compared with the pendulum cross-suspension method used in U.S. Pat. No. 5,724,744, the present solution reduces friction by using only two bearings instead of four and hence increases the sensitivity of the swinging system, on which the repeatability of the return of the pendulum always into the vertical position depends, and consequently the precision of the horizontally projected laser ray.

The device is also of much smaller dimensions than the known solutions because of the use of a smaller number of bearings.

The axis X of the pin 4 is preferably parallel to the surface N on which the feet 3 rest, so that the weight of the entire assembly below the bearing 5 fully cooperates, without providing reductive components, with the torque which returns the swinging assembly into its equilibrium position when the device is moved. Moreover, by arranging the bearing 9 in a position radial to the bearing 5, ie such that the axis of the bearing 9 lies in the middle plane through the bearing 5, any play within the bearings is always totally taken up in a vertical direction by the weight of the entire underlying swinging assembly. Because of the small number of constructional parts, the gravity-based self-levelling device of the invention is simple and economical, but very sensitive.

The pendulum suspension linkage, which uses only two mutually perpendicular bearings 5, 9, for example ball bearings, suitably positioned relative to each other, can also comprise supplementary bearings, for example twin bearings, added to those already indicated. However the dimensions and weight of the device and the friction of the swinging system will increase.

Figure 2:
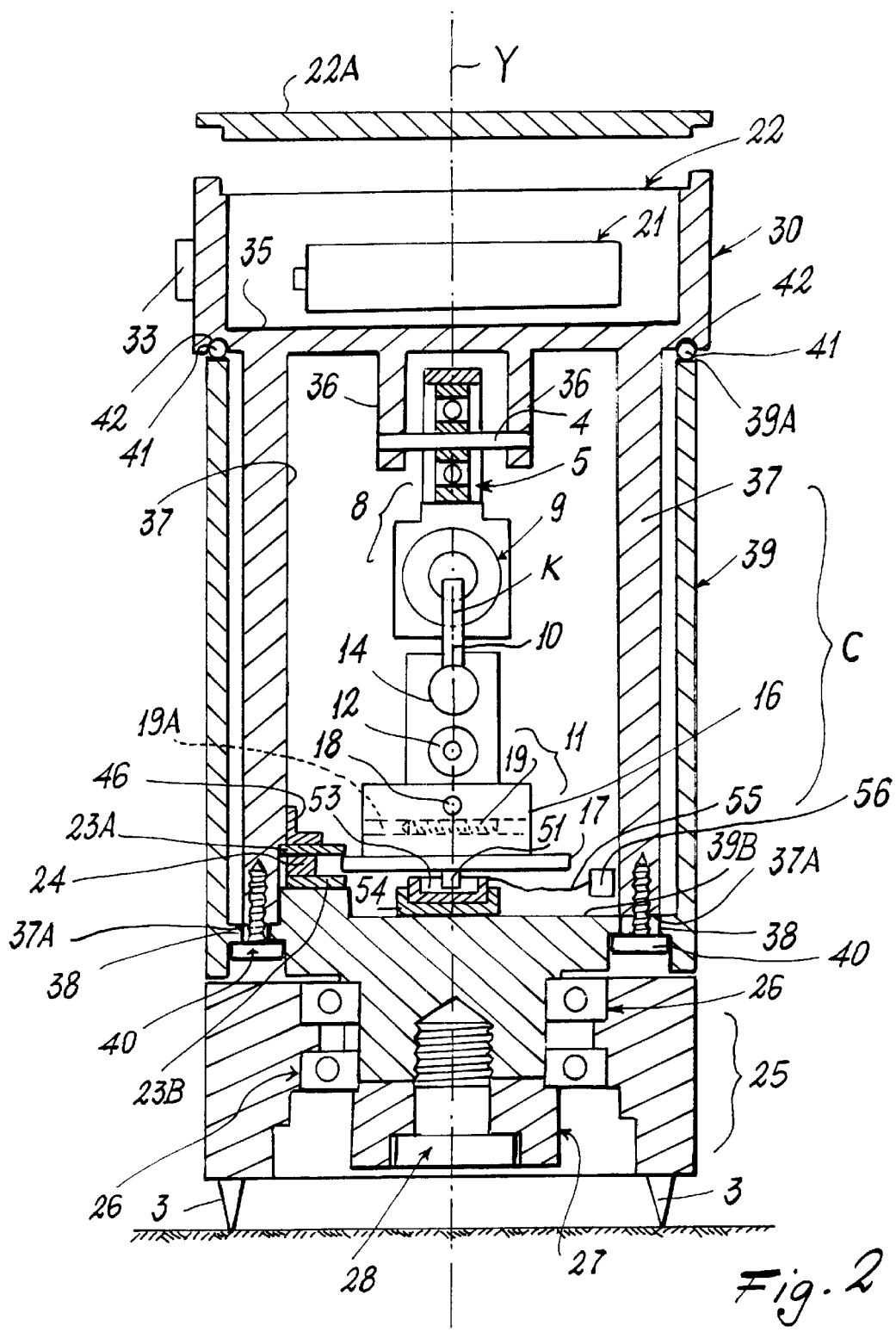
FIG. 2 is a view similar to FIG. 1 but of a second device of the invention.

A different embodiment of the invention is shown in FIG. 2, in which the case C in the form of a hollow housing 1 containing the entire swinging system already illustrated in FIG. 1, can rotate on a base 25 about its longitudinal axis Y via at least one bearing 26 or preferably two coaxial bearings for greater stability. With the pendulum in its rest position, on rotating the housing 1 on the base 25, the visible horizontal laser ray is projected through 360° to trace on a wall a horizontal laser plane useful for levelling. A block 27 fixed to the bottom of the housing 1 by a screw 28 retains the bearing or bearings 26 in their working position between the base 25 (provided with the feet 3) and the housing 1.

The pendulum also rotates when the case is rotated on its base, hence in order for the pendulum to undergo only rotation about its own axis rather than revolution about the axis Y of rotation of the case C, the pendulum suspension point, which coincides with the centre of the bearing to which its shank or rod 10 is rigidly connected, must lie on the axis of rotation Y of the case. In this manner, on rotating the case on its base 25, the pendulum 11 rotates about its axis K when in the equilibrium position, so projecting an always horizontal laser ray through 360°.

FIG. 2 also shows a particular embodiment of the hollow housing 1 which results in a constructional saving.

In this variant, the housing comprises an element 30, formed for example by injection into a mould of aluminium or preferably of resistant plastic. The element 30 comprises the upper cavity or container 22 housing the powering batteries 21 for the laser diode 12, these being activated by a switch 33 and covered by the cover 22A. The base 35 of the container 22 represents the support point for the swinging unit. For this purpose, said base 35 comprises for example two supports 36 which can be formed directly on the element 30 to support the fixed pin 4. From the base 35 of the container there project three rods 37 of sufficient length to terminate slightly below the copper disc 17. These rods have their free end 37A hollow and threaded, and mate with holes 38 in a cup-shaped element 39 (the rods of the element 30 are inserted into and hence contained in the element 39), said holes receiving screws 40 connected to the element 30 (by being inserted into the ends 37A). Gaskets 41 provided at the free end 39A of the element 39 are housed in seats 42 provided in the element 30. These seal the connection between the element 39 and the element 30.

The ferromagnetic plate 23A, forming the upper part of the magnetic damping device, is fixed in proximity to the end of the three rods 37 by means for example of a bracket 46. The magnet 24 and the other plate 23B lying below it are rigid with the top 39B of the element 39, so that when this latter is screwed to the rods 37 the copper disc 17, on swinging, can cut the magnetic flux by becoming inserted into the space between the two plates. With the illustrated system the swinging unit can be assembled under conditions of total visibility with extreme simplicity and accessibility, so making the device of the invention even more economical.

FIG. 2 also shows a pendulum swing limiting device which is also able to extinguish the laser ray when the pendulum reaches its end of travel position, so avoiding the risk of levelling errors. This device comprises a protuberance 51 rigid with the mass or weight 16 and electrically insulated from the disc 17, but connected to the negative pole of the batteries 21, it being contained within a hollow stainless steel cylinder 53 insulated from the element 39 by a support 54 of insulating material. This cylinder is connected by an electric cable 55 to a known electronic device 56 connected to the positive pole of the batteries 21 and arranged to interrupt power to the laser diode 12 each time the protuberance 51 touches the cylinder 53 to close the circuit which in this case begins and terminates at the batteries 21.

As stated, the batteries 21 are connected to the card 14 by wires 20. It has been found that the force of the wires which connect the batteries to the card on the swinging assembly 11 can generate a torque which alters the correct equilibrium position of the pendulum and consequently the precision of the laser ray.

Figure 3:
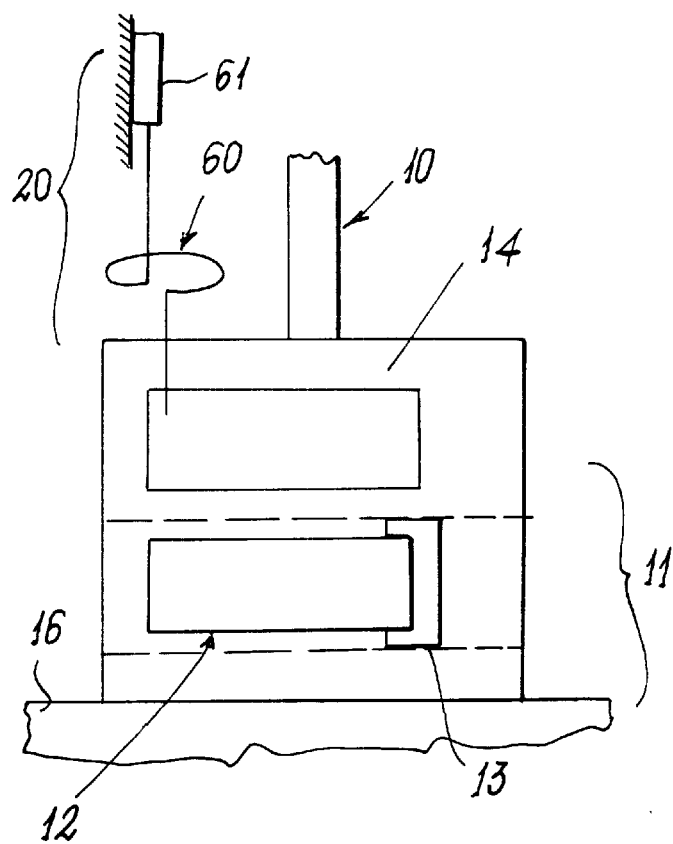
FIG. 3 is a variant of that part indicated by A in FIG. 1.

One economical solution to overcome this drawback is to use a common phosphor bronze wire of about 50 to about 100 micron diameter shaped as a spiral 60 as shown in FIG. 3. The phosphor bronze wire is limited to just that short length connecting the card 14 to the end of a common insulation-covered wire 61 of greater diameter connected to the batteries 21 and fixed to the wall of the case or rather to an appendix or rod 37 of the element 30. It has been found that during the swinging motion the opening and closure of the spiral formed in this manner make the pendulum 11 practically insensitive to this force while at the same time the voltage drop due to the resistance of this short length of thin wire is insignificant.

Figure 4:
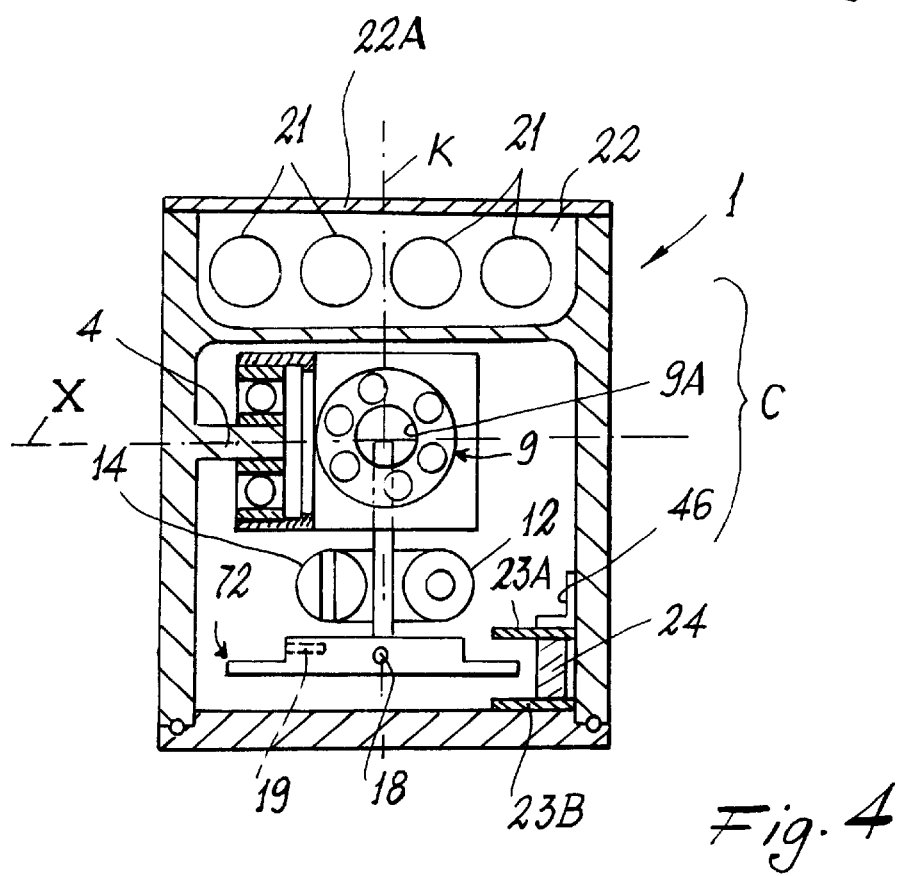
FIG. 4 is a view similar to FIG. 1, but of a third device of the invention.

Another embodiment of the invention is shown in FIG. 4 in which, in order to reduce the total height of the device, the bearing 9, the movable ring 9A of which is connected to the pendulum, is positioned with its axis incident and perpendicular to the axis X of the bearing 5 secured to the case C. Compared with the preceding solutions, the barycentre of the pendulum 11 on which the laser diode 12 is directly mounted does not lie in the middle plane through the bearing 5 secured to the case C. In contrast, as illustrated hereinafter, as the length of the pendulum 11 is less, the swing frequency is greater, so accelerating the damping effect due to the currents induced in the disc of the already described magnetic damping system.

The weight 16 and the disc 17 associated with the pendulum 11 are combined into a single piece of copper 72 provided with a thinner edge to penetrate the magnetic field between the plates 23A and 23B enclosing the magnet 24. Furthermore, the card 14 is positioned horizontally to the side of the laser diode 12 which generates the collimated ray perpendicular to the plane in which FIG. 4 lies, ie horizontal when the pendulum is in its rest position. Two usual screws 18 and 19 perpendicular to each other and both perpendicular to the K axis enable the barycentre of the pendulum weight to be varied. Alternatively, a single screw preferably perpendicular to the axis K could achieve the aforesaid variation.

If a rotary base 25 is associated with the configuration of FIG. 4 as shown in FIG. 2, the centre of the bearing 9 must lie on the axis Y about which the case rotates on the base 25.

Figure 5:
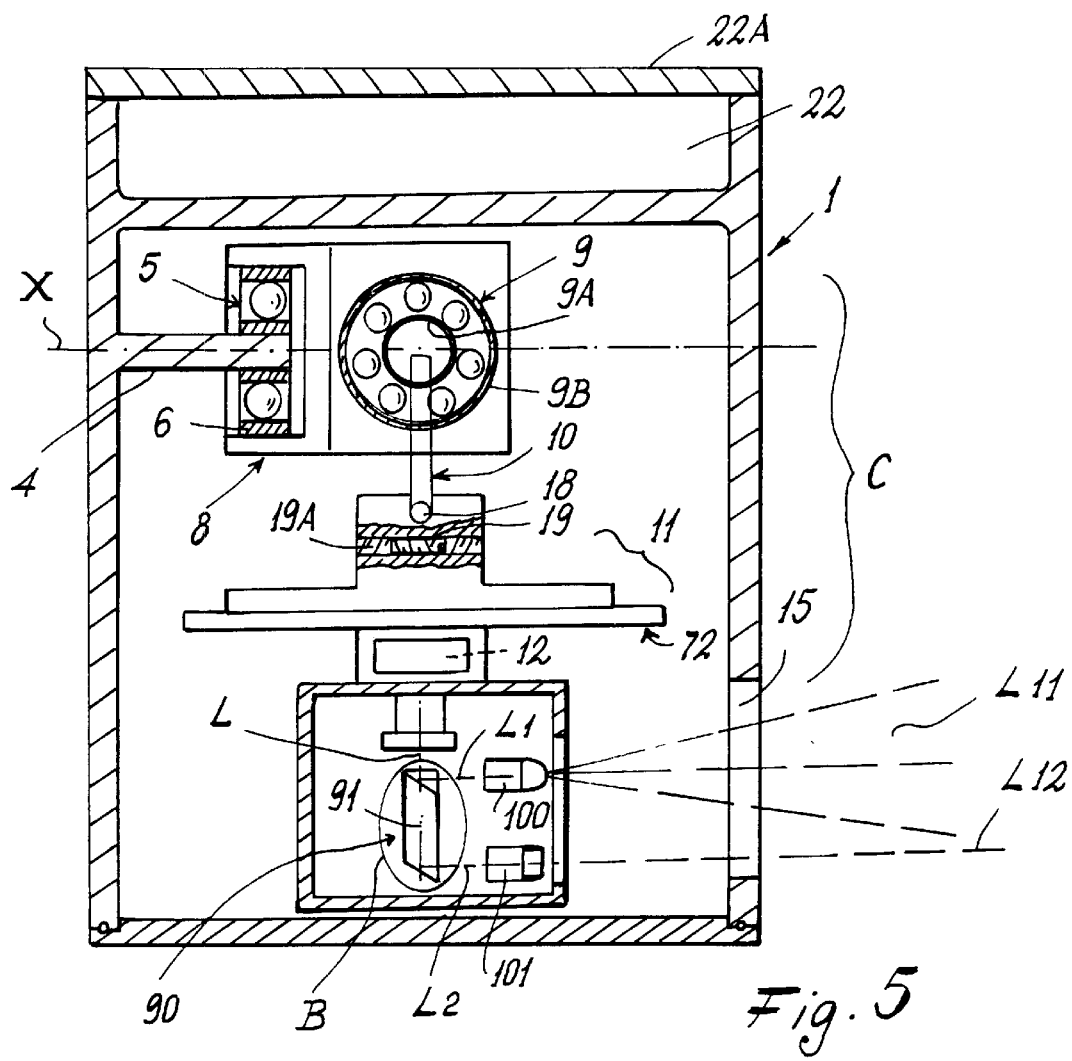
FIG. 5 is a view similar to FIG. 1, but of a fourth device of the invention.

FIG. 5 shows a further embodiment of the invention in which, omitting the description of those parts common to the already described embodiments, the diode 12 generating the collimated laser ray is positioned on the pendulum 11 to project a vertical laser ray L when the pendulum is in its rest position. Along the laser ray trajectory there is an optical unit 90 able to split the ray into two parallel rays L1 and L2 deviated through 90° in the same direction. These rays arrive at corresponding optical units 100 and 101 by which mutually perpendicular flat beams L11 and L12 of laser rays are emitted.

Figure 6:
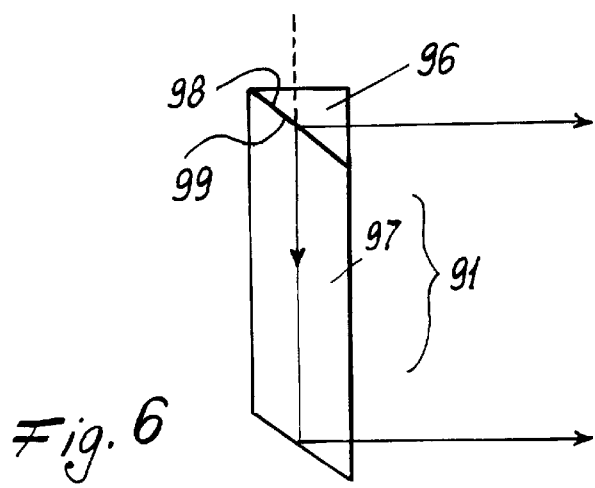
FIG. 6 is a detailed side view of that part indicated by B in the device shown in FIG. 5.

The optical unit 90 is rigidly connected to the laser diode 12 as are the optical units 100 and 101, in the sense that all these components are carried by the pendulum. By way of example, the unit 90 consists of a particular type of glass unit 91 of known shape (FIG. 6) which splits the ray L into the ray L1 deviated through 90° and into an undeviated ray which is then deviated through 90° by the reflecting outer face 94 of the glass to define the laser ray L2, in the same direction as the ray L1. The glass unit 91 shown in FIG. 6 is known and consists of two glass portions 96 and 97 mating at their faces 98 and 99, the first portion 96 being a semireflecting pentaprism and the second 97 a parallelepiped of parallelogram cross-section.

The two rays L1 and L2 are parallel, when the pendulum 11 is at rest both the rays being horizontal in that they both represent a 90° deviation from a vertical ray. By interposing within the trajectory of each of them the two optical units 100 and 101 (of known type, for example such as those described in U.S. Pat. No. 5,782,003), consisting of at least one semicylindrical lens, the two flat beams L11 and L12 of laser rays are obtained. In known manner, by rotating the two optical units 100 and 101 about their horizontal axis, they can be adjusted such that when the pendulum 11 is at rest one of the two beams is horizontal (indicated in the figure by L12) and the other beam, perpendicular to it, is vertical (indicated by L11). In this manner, two mutually perpendicular flat beams of laser rays can be generated which with the pendulum at rest project two visible lines, namely horizontal and vertical, which intersect as a cross. This solution is useful for simultaneous or separate horizontal and vertical alignments. By rotating the housing 1 on the base 21 (if provided) or on a suitable support, the cross of light with horizontal and vertical arms is made to rotate, the device hence representing an instrument which is very useful especially in internal environments.

Alternatively, the two flat beams of laser rays L11 and L12 can be obtained (FIGS. 7A and 7B) by mounting on the pendulum 11 a pair of laser diodes 120 and 121 provided with their own control circuits 120A and 121A which project in the same direction parallel rays L110 and L120 which are horizontal when the pendulum 11 is at rest. By inserting into the trajectory of each of these, and rigid with the respective diodes, optical units 123 and 124 similar to the aforedescribed units 100 and 101, each diode 120 and 121 is able to generate a flat beam of rays which is respectively horizontal or vertical depending on the adjustment of the optical units 123 and 124.

Although functional, with this solution it is more difficult to adjust the two parallel rays generated by two separate diodes than the solution of FIG. 5. Such adjustment is avoided by using, as in FIG. 5, a single ray L split by a suitable optical unit 90, in that this always deviates through 90° the vertical ray which strikes. As an alternative to the particular glass unit shown in FIGS. 5 and 6, a pentaprism 200 (FIG. 8) can be used which, again starting from a vertical ray L1 when the pendulum is at rest, splits the ray into one at 90° and one at 180° (L1 and L2 respectively), and then deviates the ray L2 through 90° by a reflecting mirror 202 suitably interposed within its trajectory, the pentaprism and the mirror being rigid with the diode 12 (this latter, the pentaprism and the mirror being rigid with the pendulum). However with this solution the mirror 202 is difficult to adjust.

A further embodiment of the invention is shown in FIG. 9, in which the housing 1 of the case C is rotated on the base 25 by the action of a battery-powered d.c. electric motor 300 controlled by a normal remote control. The exit shaft of the motor 300 is connected via a known transmission system 301, for example a pinion 302 and ring gear 303 or a belt and pulley (not shown), to the case C. In this manner the projection of laser rays L or flat beams of laser rays onto the desired point can be remotely controlled in a simple and practical manner.

What is claimed is:

1. A portable gravity-based self-levelling device for outwardly projecting a laser ray or a flat beam of laser rays (L, L11, L12, L110, L120) in a horizontal and/or vertical direction even if the device lies in an inclined position, said device comprising: a case (C) in the form of a hollow housing (1) provided with resting members (3); a pendulum (11) suspended inside the case (C) by suspension means (5, 9), said pendulum comprising a mass or weight (16) at its bottom; means (23A, 23B, 24) for damping the pendulum swing; means (18, 19) for adjusting the equilibrium position of the pendulum (11); and, mounted on the pendulum (11), means (12), operable from the outside and powered by at least one battery (21) contained in the case (C), for projecting collimated visible laser rays, and able, when the pendulum (11) is in its rest position, to outwardly project a horizontal collimated laser ray or at least one horizontal and/or vertical flat beam of laser rays wherein the suspension means comprise at least one first mechanical decoupling member such as a ball or roller bearing (5), associated with the hollow housing (1), and a second mechanical decoupling member such as a ball or roller bearing (9), associated by way of a first part (9B) thereof with a movable part (6) of said first decoupling member (5), a second part (9A) of said second member supporting the pendulum (11), the two members or bearings (5, 9) lying in mutually perpendicular planes.

2. A device as claimed in claim 1, wherein the first member or bearing (5) is supported by an element (4) fixed to the case, the movable part (6) of said member being connected via a rigid element (8) to the second member or bearing, of which the first part (9B) is rigidly fixed to the rigid connection element (8) and of which that part (9A) free to rotate relative to said first part (9B) is rigidly connected to a rigid shank (10) of the pendulum having its fulcrum in said second member (9).

3. A device as claimed in claim 2, wherein the axis (X) of the first member or bearing (5) lies in the middle plane through the second member or bearing (9), said first bearing being positioned within the case with its axis (X) parallel to the surface (N) on which the resting members (3) lie.

4. A device as claimed in claim 3, wherein the second member or bearing (9) is located in a position radial to the first bearing or decoupling member (5), such that the axis of said second member (9) lies in the middle plane through the first member (5).

5. A device as claimed in claim 3, wherein the axis (X) of the first bearing perpendicularly cuts the axis of the second bearing.

6. A device as claimed in claim 1, wherein the mass or weight (16) of the pendulum or moving assembly (11) carries the means for adjusting the equilibrium position of this latter, these means comprising at least one threaded member (18, 19) positioned in a corresponding seat (18A, 19A) having its axis preferably perpendicular to the axis (K) of the pendulum (11).

7. A device as claimed in claim 1, wherein the damping means comprise a disc (17) of electrically conducting material, such as copper or the like, associated with the free end of the pendulum (11) to cooperate with magnetic field generating means (23A, 23B, 24) at least partly associated with the hollow housing.

8. A device as claimed in claim 7, wherein the magnetic field generating means are at least two pairs of plates (23A, 23B) of ferromagnetic material between which a permanent magnet (24) is positioned, said pairs being at least partly associated with the hollow housing (1) and positioned at an angle to each other, the disc (17) connected to the pendulum becoming inserted between each said pair during the pendulum swing but before attainment of its equilibrium position.

9. A device as claimed in claim 7, wherein the magnetic field generating means are at least two magnetic units each comprising at least one permanent magnet, in each unit there facing each other spaced-apart opposite magnetic poles between which a disc of conducting material becomes inserted as it swings.

10. A device as claimed in claim 1, wherein the resting members (3) are associated with a base (25) on which the hollow housing (1) can rotate.

11. A device as claimed in claim 10, wherein the centre of rotation of the second member or bearing (9) lies on the axis (Y) about which the hollow housing (1) of the case (C) rotates on the base (25).

12. A device as claimed in claim 10, further comprising electrical actuator means (300) for actuating the rotation of the case (C) on the base (25), said means (300) being advantageously remotely controllable.

13. A device as claimed in claim 1, wherein the hollow housing (1) comprises a first and a second element (30, 39) inserted one into the other and connected together in a sealed manner, the first element (30) being internal to the second (39) and supporting the pendulum (11).

14. A device as claimed in claim 1, further comprising travel limiting means (51, 53) arranged to prevent the pendulum (11) swinging too widely.

15. A device as claimed in claim 14, wherein said limiting means (51, 53) cooperate with means (56) for interrupting laser ray generation by the laser ray projection means (12).

16. A device as claimed in claim 1, wherein the projection means comprise at least one laser diode (12) with which there is rigidly associated an optical unit (13; 90; 200; 202) which the laser ray emitted by the diode (12) strikes before leaving the housing (1) of the case (C).

17. A device as claimed in claim 16, wherein the optical unit (90; 200; 202) is of the type able to split the laser ray (L) emitted by the laser diode (12) into two rays (L1, L2) deviated through 90° from said laser ray (L), said deviated rays (L1, L2) reaching further corresponding optical units (100, 101) rigid with the laser diode which each generate a flat beam of laser rays, said beams being perpendicular to each other and, when the pendulum (11) is at rest, horizontal and vertical respectively.

18. A device as claimed in claim 16, characterised in that the projection means are two laser diodes (120, 121) mounted on the pendulum in such a manner as to project two parallel rays which are horizontal when the pendulum (11) is at rest, each of said rays striking a corresponding optical unit (123, 134) rigid with each of said diodes respectively, to generate a flat laser beam, said flat beams being perpendicular to each other and, when the pendulum (11) is at rest, horizontal and vertical respectively.

\* \* \* \* \*